(12) United States Patent
Lee et al.

(10) Patent No.: US 10,019,412 B2
(45) Date of Patent: Jul. 10, 2018

(54) DISSOCIATIVE VIEW OF CONTENT TYPES TO IMPROVE USER EXPERIENCE

(71) Applicant: Verizon Patent and Licensing Inc., Arlington, VA (US)

(72) Inventors: Woo Beum Lee, Basking Ridge, NJ (US); Michelle Felt, Randolph, NJ (US); Thiru Voonna, Somerset, NJ (US); Ashish Rao, Ocean, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 35 days.

(21) Appl. No.: 15/080,549

(22) Filed: Mar. 24, 2016

(65) Prior Publication Data
US 2017/0277661 A1    Sep. 28, 2017

Related U.S. Application Data

(60) Provisional application No. 62/311,406, filed on Mar. 22, 2016.

(51) Int. Cl.
| | |
|---|---|
| *G06F 17/21* | (2006.01) |
| *G06F 17/27* | (2006.01) |
| *G06F 3/048* | (2013.01) |
| *G06F 3/0482* | (2013.01) |
| *G06F 3/0484* | (2013.01) |
| *G06F 17/22* | (2006.01) |

(52) U.S. Cl.
CPC .......... *G06F 17/211* (2013.01); *G06F 3/0482* (2013.01); *G06F 3/04842* (2013.01); *G06F 17/2247* (2013.01); *G06F 17/2288* (2013.01); *G06F 17/272* (2013.01)

(58) Field of Classification Search
CPC .......... G06F 17/30905; G06F 17/3089; G06F 17/30277; G06F 3/04886; G06F 3/0482; G06F 3/04842; G06F 3/0416; G06F 3/048; G06F 3/125; G06F 17/2288; G06F 17/211; G06F 17/30861; G06F 3/038
See application file for complete search history.

(56) References Cited

U.S. PATENT DOCUMENTS

| | | | | |
|---|---|---|---|---|
| 2009/0066728 | A1* | 3/2009 | Ording | G06F 17/212 345/652 |
| 2009/0305685 | A1* | 12/2009 | Takahashi | G06F 3/0481 455/418 |
| 2010/0125816 | A1* | 5/2010 | Bezos | G06F 3/012 715/863 |
| 2014/0053054 | A1* | 2/2014 | Shen | G06F 17/30905 715/234 |
| 2014/0152563 | A1* | 6/2014 | Ouchi | G06F 3/038 345/158 |
| 2015/0348114 | A1* | 12/2015 | Tanaka | G06Q 30/0261 705/14.58 |

* cited by examiner

*Primary Examiner* — Ariel Mercado Vargas

(57) ABSTRACT

A user device may receive a web page having multiple different types of content (e.g., text, images, videos, etc.). The user device may identify the different types of content, and may generate reformatted pages that each include a particular type of content associated with the web page. For instance, one reformatted page may include text content of the web page, without including image content of the web page (and/or vice versa). The reformatted pages may include resized and/or repositioned versions of the original content (e.g., resized and/or reformatted images and/or text).

20 Claims, 11 Drawing Sheets

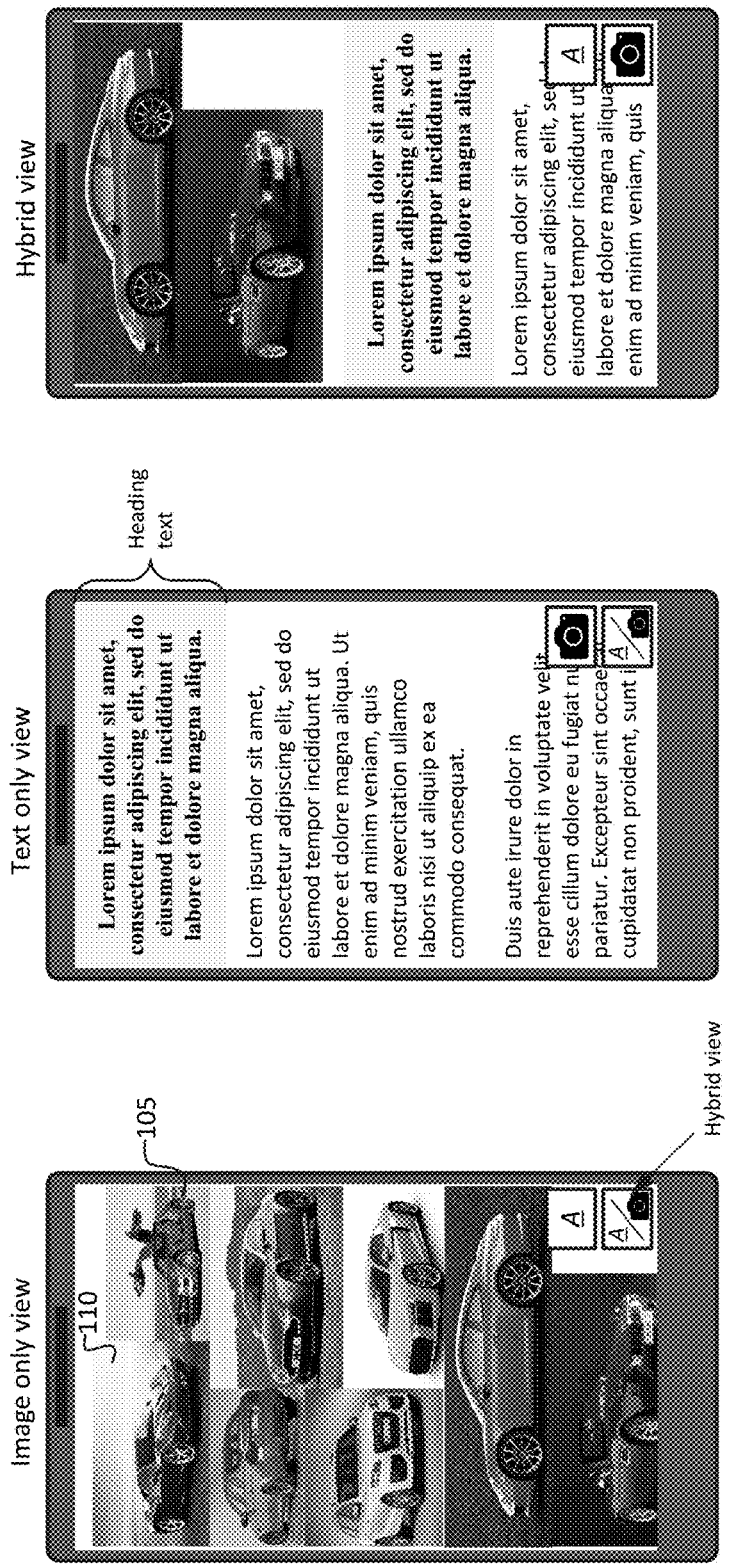

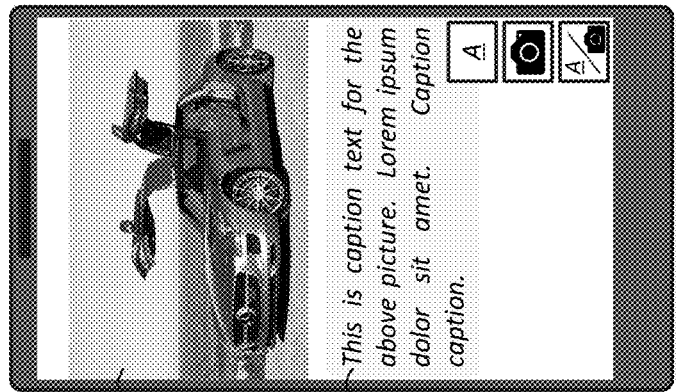
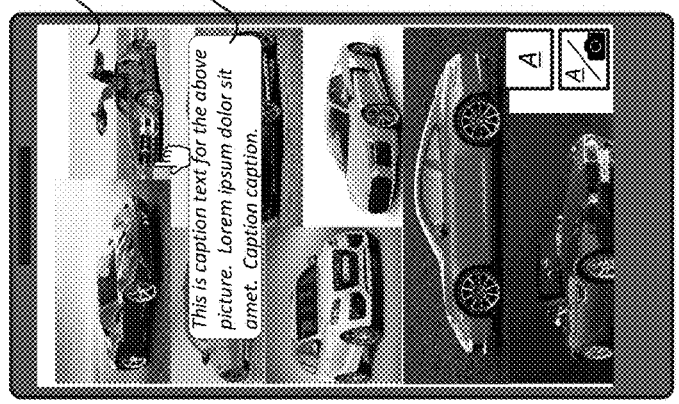
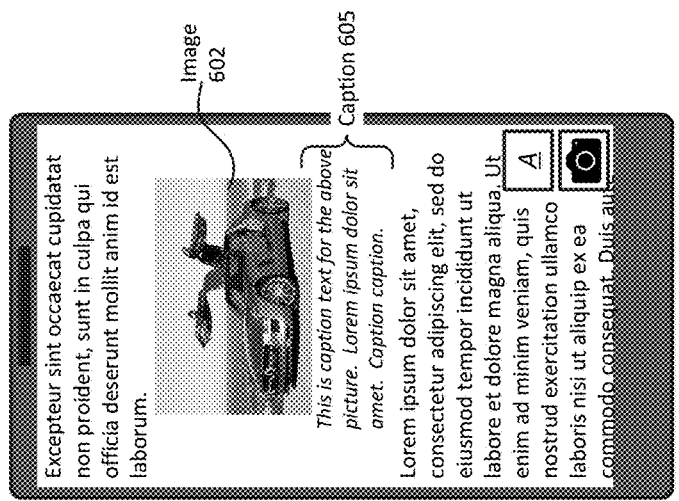
Fig. 6C
Fig. 6B
Fig. 6A

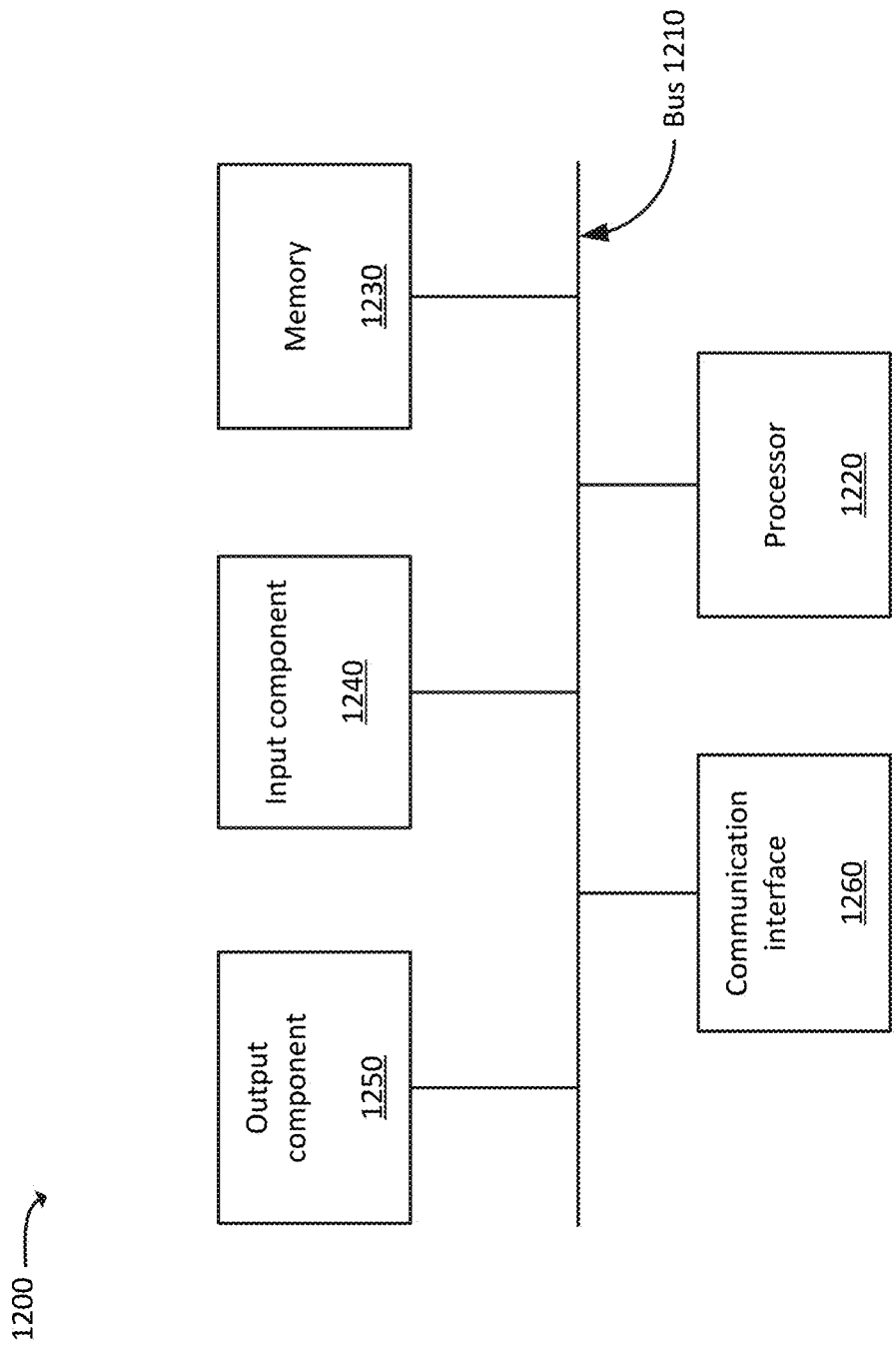

DISSOCIATIVE VIEW OF CONTENT TYPES TO IMPROVE USER EXPERIENCE

BACKGROUND

Content providers, such as providers of web content (e.g., "web pages") often include different types of content in web pages. For example, web pages may have text, images, and/or video content. Traditionally, web pages are formatted for viewing on desktop computers, which may be connected to monitors that typically exceed 20 inches (in terms of diagonal measurement) in size.

BRIEF DESCRIPTION OF THE DRAWINGS

FIGS. 2A and 2B illustrate example user interfaces that correspond to "image only" and "text only" views, respectively, of individual different content types on a web page;

FIG. 2C illustrates an example user interface that corresponds to a hybrid view of multiple different content types on a web page;

FIGS. 6A-6C illustrate example user interfaces that illustrate the handling of captions for images presented in a web page, when reformatting the web page in accordance with some implementations;

FIG. 12 illustrates example components of a device, in accordance with some implementations described herein.

DETAILED DESCRIPTION OF PREFERRED EMBODIMENTS

The following detailed description refers to the accompanying drawings. The same reference numbers in different drawings may identify the same or similar elements.

Figure 1A:
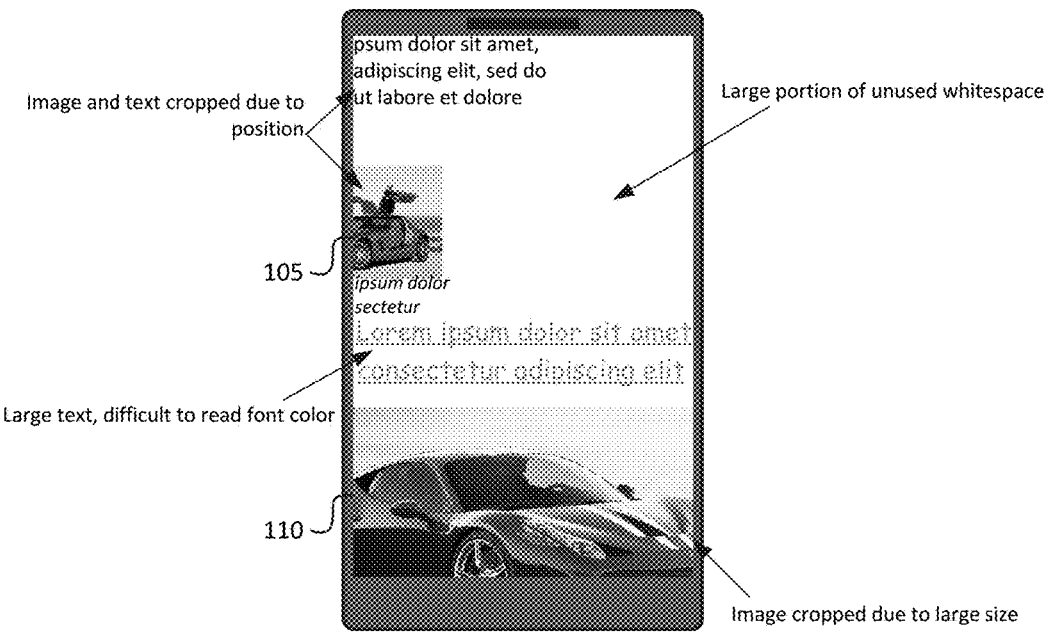
FIG. 1A illustrates potential shortcomings of traditional web pages when viewed on a mobile device.

When users of mobile devices (e.g., smart phones or tablet computers) access web pages that are formatted for desktop computers, such users may have a degraded user experience. For instance, images, text, and/or video may not be displayed in a convenient or easily accessible manner. For instance, as shown in FIG. 1A, a smart phone may be used to access a web page that includes text and an image, but was designed for a larger screen (e.g., for a monitor of a desktop or laptop computer). As shown, some of the text may be cropped (e.g., the right half of a paragraph of text may be shown on the screen, while the left half of the paragraph of text may be off the screen). As another example, an image (i.e., image 105) may be positioned in such a way that the right half of the image is on the screen, and the left half of the image is off of the screen. As yet another example, an image (i.e., image 110) may be sized too large to fit on the screen of the mobile device, and may be cropped in multiple ways (e.g., as shown, the left, right, and bottom portions of a particular image may be off of the screen). As a further example, some text may be relatively large, may be a typeface or color that is difficult to read, etc. Additionally, the web page may not make efficient use of space, and may have a relatively large area of unused whitespace. Any or all of these characteristics may lead to a poor user experience.

Figure 1B:
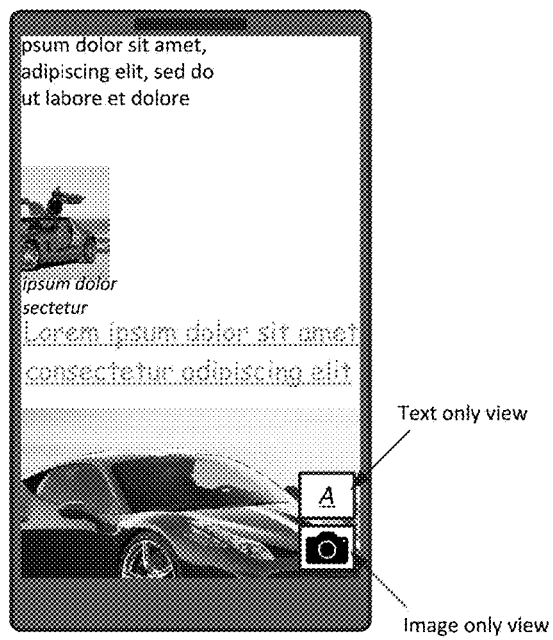
FIG. 1B illustrates selectable options, in accordance with some implementations, which may allow a user to dissociate different content types in order to view different content types separately.

In accordance with some implementations described herein, the web page may be reformatted in order to enhance the user experience. For instance, a user may be given the option to "dissociate" different content types (e.g., options to view text only, images only, or a reformatted hybrid view that shows images and text in a more readable manner). For instance, as shown in FIG. 1B, a button may be provided for a "text only" view, and for an "image only" view.

FIG. 2A illustrates an example "image only" view. The "image only" view may include the images (e.g., only the images, and not text) that were originally present in the web page (e.g., the web page shown in FIG. 1A or 1B, before the selection of the "image only" button). The images, shown in the "image only" view, may be reformatted, with respect to how they were originally presented. For instance, the images may be repositioned on the screen, and/or may be resized. In some implementations, the images may be arranged in a "mosaic" manner, in order to minimize whitespace and enhance efficiency. Additionally, the images may be positioned and/or sized such that each particular image may be viewed on the screen without being cropped. For instance, image 105 (i.e., the image that was positioned such that a portion of the image was cropped in FIGS. 1A and 1B) may be sized and positioned such that the entire image 105 is viewable on the screen. As another example, image 110 (i.e., the image that was too large to fit on the screen in FIGS. 1A and 1B) may also be sized and positioned such that the entire image 110 is viewable on the screen. As further shown, the "image only" view may also include buttons to allow the user to select another view (including a "hybrid" button, a "text only" button, etc.).

FIG. 2B illustrates an example "text only" view. The "text only" view may include some or all of the text (e.g., only the text, and not the images) that were originally present in the web page (e.g., the web page shown in FIG. 1A or 1B, before the selection of the "text only" button). The text, shown in the "text only" view, may be reformatted with respect to how the text was originally presented. For example, as shown, the text may be sized and/or positioned such that the text does not run off of the screen. As further shown, in some implementations, the text may be aligned to one or more edges of the screen (e.g., may be aligned to the left edge of the screen, in this example). Additionally, in some implementations, text headings and/or titles may be identified and formatted differently from other text. For example, as shown, heading text may be bolded, may be a different typeface than the other text, may be a larger font than the other text, may be highlighted, etc. Heading text may, for instance, correspond to a title of a news article or a blog entry. The text, presented in the "text only" view, may be differently formatted than the text originally included in the web page. For instance, the text, labeled as "Large text, difficult to read font color" in FIG. 1A, may be reformatted to a smaller font or to a different color in a "text only" view.

FIG. 2C illustrates an example "hybrid" view. The "hybrid view" may include some or all of the text and/or images that were originally present in the web page. In some implementations, the hybrid view may present the images in one distinct display area, and the text in another distinct display area. For instance, the example hybrid view shown in FIG. 2C may essentially be the "image only" view at the top portion of the page, and the "text only" view at the bottom portion of the page (where the page may be scrollable up and/or down, in order to view the images and/or the text). In some implementations, the hybrid view may present the text first, and then the images, and/or may arrange the text and/or images in some other way.

Figure 3:
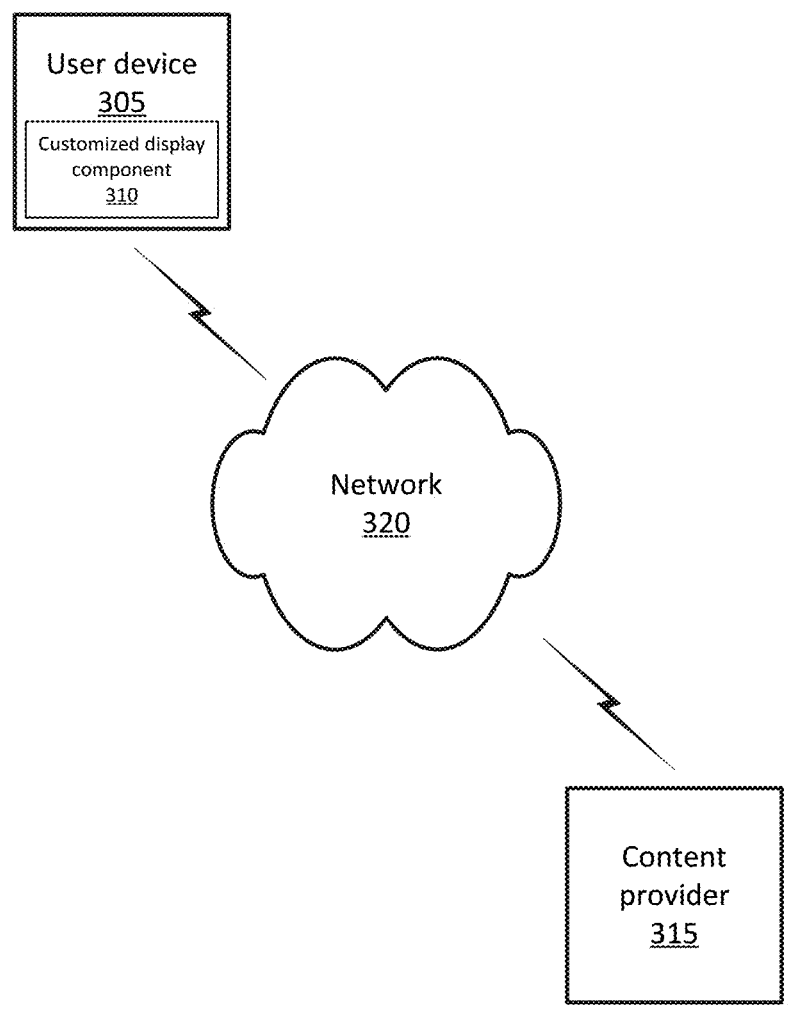
FIG. 3 illustrates an example environment, in which systems and/or methods, described herein, may be implemented.

FIG. 3 illustrates an example environment 300, in which systems and/or methods described herein may be implemented. As shown in FIG. 3, environment 300 may include user device 305 (which may include and/or be otherwise associated with customized display component 310), content provider 315, and network 320.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300. Also, while "direct" connections are shown in FIG. 3 between certain devices, some devices may communicate with each other via network 320 (and/or another network).

User device 305 may include any computation and communication device that is capable of communicating with one or more networks (e.g., network 320). For example, user device 305 may include a device that receives content, such as web pages (e.g., that include text content and/or image content), streaming audio and/or video content, and/or other content, via an Internet connection and/or via some other delivery technique. In some implementations, user device 305 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

Customized display component 310 may be associated with user device 305, in that customized display component 310 may be implemented by hardware circuitry and/or software logic associated with user device 305. In some implementations, customized display component 310 may be implemented as an external device that is communicatively coupled with user device 305, and communicates with user device 305 via a wired or wireless interface. As described herein, customized display component 310 may perform reformatting and/or dissociation techniques described herein, in which different types of content (e.g., text, images, videos, etc.) that are present in a web page may be reformatted and presented individually, in order to enhance the experience of a user of user device 305.

Content provider 315 may include one or more server devices (e.g., a single physical device or a distributed set of devices) that provide content (e.g., web content, such as web pages that include text, images, videos, and/or other types of content) to user device 305. In some implementations, web content, provided by content provider 315, may not be "optimized," in the sense that the web content may not include code that is specifically designed to communicate with customized display component 310. For instance, the web content may include traditional or conventional code, such as Hyper Text Markup Language ("HTML") code, JavaScript, and/or other types of code that is known. In some implementations, and as described herein, the web content may include code that is specifically designed to communicate with customized display component 310, such as code that specifies and/or delineates content types, and/or otherwise implements an Application Programming Interface ("API") used and/or recognized by customized display component 310.

Network 320 may include one or more radio access networks ("RANs"), via which user device 305 may access one or more other networks or devices, a core network of a wireless telecommunications network, an IP-based packet data network ("PDN"), a wide area network ("WAN") such as the Internet, a private enterprise network, and/or one or more other networks. In some implementations, network 320 may be, or include, a cellular network, such as a Long-Term Evolution ("LTE") network, a Third Generation ("3G") network, a Code Division Multiple Access ("CDMA") network, etc. User device 305 may connect, via network 320, to data servers, application servers, other user devices 305, etc. Network 320 may be connected to one or more other networks, such as a public switched telephone network ("PSTN"), a public land mobile network ("PLMN"), and/or another network.

Figure 4:
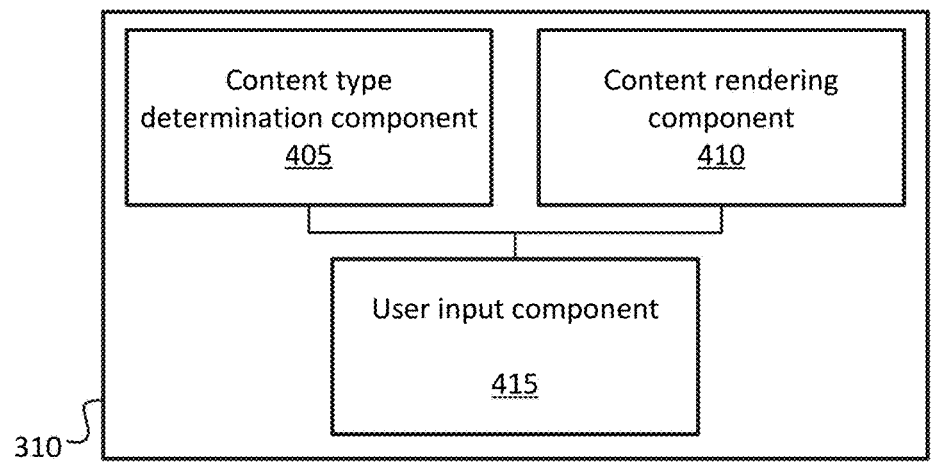
FIGS. 4 and 5 illustrates example functional components of a user device, in accordance with some implementations.

FIG. 4 illustrates example functional components of customized display component 310, in accordance with some implementations. As mentioned above, customized display component 310 may be implemented, via hardware circuitry and/or software logic, as part of user device 305, and/or may be communicatively coupled to user device 305. As shown, customized display component 310 may include content type determination component 405, content rendering component 410, and user input component 415. Components 405-415 may be implemented via hardware circuitry and/or hardware logic of user device 305 and/or customized display component 310. In some implementations, customized display component 310 may include additional, fewer, different, and/or differently arranged components than those shown in FIG. 4.

Content type determination component 405 may determine the type, or types, of content present in web content received from content provider 315. For instance, assume that user device 305 receives a web page (e.g., an HTML document that includes text, code that specifies references to image content, etc.) from content provider 315. Content type determination component 405 may analyze the web page to determine what types of content are included in the web page, such as text, images, videos, etc.

Figure 5:
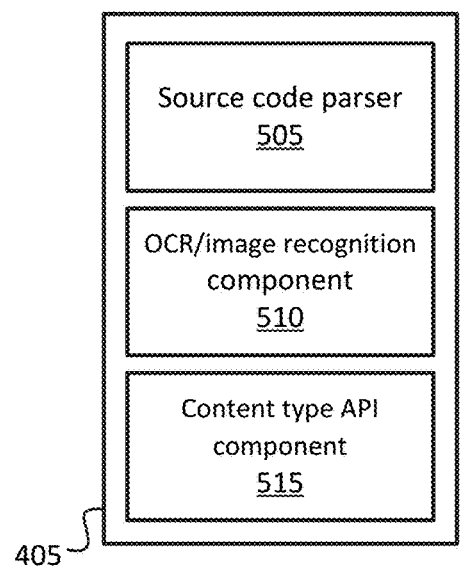

As shown in FIG. 5, content type determination component 405 may include the functional components, source code parser 505, optical character recognition ("OCR")/ image recognition component 510, and content type application programming interface ("API") component 515. Components 505-515 may be implemented via hardware circuitry and/or hardware logic of user device 305, customized display component 310, and/or content type determination component 405. In some implementations, content type determination component 405 may include additional, fewer, different, and/or differently arranged components than those shown in FIG. 5.

Source code parser 505 may parse the source code of a received web page, in order to identify different content types. For instance, source code parser 505 may parse HTML code of the received web page, and may identify content types based on HTML "tags," such as <head>, <title>, <body>, <caption>, <table>, <map>, <img>, <figure>, <figcaption>, <video>, and/or other tags. Source code parser 505 may determine, for example, that text within a <title> construct (i.e., between a <title> opening tag and a </title> closing tag) is text content. Source code parser 505 may further determine that the text within the <title> construct is title text (which may be formatted differently than text within a <body> construct, as described herein).

Source code parser 505 may also determine, for example, typefaces, fonts, colors, and/or other characteristics of text, in order to determine whether text should be considered as "title" text or "body" text. For instance two different blocks of text may be within a single <body> construct, but one block may be a larger typeface than the other block. Source code parser 505 may determine that the first block (i.e., the text block having the larger typeface) is a title, and that the second block is not a title (e.g., is ordinary body text).

As another example, source code parser 505 may determine that text within an <img> construct may include a link to image content. For example, the text within the example code, <img src="sample_image.jpg"> may indicate that the file "sample_image.jpg" is an image. In some situations, text within an <img> construct may include other characteristics of the image, such as a size and/or position of the image. A <figure> construct may include an <img> construct and a <figcaption> construct. Source code parser 505 may identify that text, within the <figcaption> construct, is a caption for the image denoted by the <img> construct within the same <figure> construct. In some implementations, a <map> construct (and/or other types of constructs) may be treated as an image.

As yet another example, source code parser 505 may determine that text within a <video> construct may include a link to video content. For example, the text within the example code, <video src="sample_video.mp4"> may indicate that the file "sample_video.mp4" is a video. In some situations, text within a <video> construct may include other characteristics of the video, such as a size and/or position of the video.

While examples are provided above in the context of identifying text, image, and video content in HTML files, in some implementations, other types of files (e.g., files in addition to, or in lieu of, HTML files) may be used to specify content in a web page. Furthermore, content types in addition to, or in lieu of, text, image, and video content may be identified by source code parser 505, such as audio content, user-fillable forms or text fields, etc.

In some implementations, some portions of a web page may include image, text, or video, but may not be explicitly identified. For example, web pages may include containers that include content that is not described via HTML tags. For instance, a web page may include an <applet> construct, in which content is programmatically added to the web page (e.g., by the execution of code that is not necessarily visible to a web browser or to content type determination component 405). In some implementations, OCR/image recognition component 510 may perform optical character recognition and/or image recognition in order to determine the type (or types) of content present in such containers.

For example, assume that a particular web page includes a container, with a specified size and position. OCR/image recognition component 510 may render a portion of the web page that corresponds to the container (and/or may render the whole web page), and may perform optical character recognition and/or image recognition on the container in order to extract and identify the content present in the container (e.g., text, images, etc.). In some implementations, in addition to, or in lieu of, parsing the source code of a web page (e.g., by source code parser 505), OCR/image recognition component 510 may perform image recognition and/or OCR techniques on some or all of the web page to identify images and/or text.

In some implementations, OCR/image recognition component 510 may identify captions of images based on the proximity of text to an image, and/or the text format as compared to the format of other text on the page. For instance, if text is relatively near an image (e.g., immediately above, below, or next to the image), and/or is smaller than other text on the web page, OCR/image recognition component 510 may identify that the text is a caption for the image.

In some implementations, content type determination component 405 may include content type API component 515, via which a content provider may explicitly specify content types in a web page. For instance, a content provider may use HTML comments (e.g., HTML tags that are not executed by a browser), with code specified by the API implemented by content type API component 515. For instance, the comment <!—body text> may be included in a web page, and may be used to denote text that content provider 315 intends to provide as body text. As another example, the comment <!—image> may be used by content provider 315 to denote an image. As yet another example, the pair of comments <!—image_1> and <!—caption_1> may be used to denote an image and a caption that corresponds to the image. In the same vein, the comments <!—image_2> and <!—caption_2> may be used to denote a second image and a caption that corresponds to the second image.

In some implementations, a different type of API may be used (e.g., in lieu of, or in addition to, the HTML comment-style code described in the example above). However, in some implementations, the techniques described herein may be able to be performed without relying on content provider 315 to provide explicit indications (e.g., via an API) of content types.

Returning to FIG. 4, once the types of content, present in a web page, are identified by content type determination component 405, content rendering component 410 may reformat and/or render the content in a dissociative manner. For example, content rendering component 410 may generate a set of reformatted web pages, where each reformatted web page includes only one type of the identified content (and not any other types of identified content). A set of reformatted web pages (that corresponds to an original web page that includes text and images) may include, for instance, a first reformatted web page that includes text (and not images) and a second reformatted web page that includes images (and not text). In some implementations, content rendering component 410 may additionally, or alternatively, generate a reformatted web page that includes a combination of identified types of content (e.g., a reformatted "hybrid" web page, as mentioned above, which may include a text section and an image section).

FIGS. 6A-6C, 7A, and 7B illustrate further examples of how content rendering component 410 may reformat and/or render content-specific web pages. For instance, as shown in FIG. 6A, an original web page (e.g., a web page as received from content provider 315) may include image 602, and a caption 605 for image 602 (i.e., the example text shown in the figure, starting with the sentence, "This is a caption for the above picture"). While the web page, shown in FIG. 6A, does not necessarily have text and/or images that are cropped (or contain other potential readability-related characteristics), techniques described herein may still be used to further improve the readability or accessibility of the web page. Content type determination component 405 may have identified image 602 and the associated caption 605, and further may have identified that image 602 and caption 605 are associated with each other (e.g., via <figure>, <img>, and <figcaption> tags; via an implementation of an API; or via image recognition/OCR).

FIG. 6B illustrates an example "image only" view that was generated, by content rendering component 410, based on the original web page shown in FIG. 6A. The "image only" view, shown in 6B, may include images from the original web page, including a reformatted version of image 602 (e.g., a resized and/or repositioned version of image 602). When a user, of user device 305, "hovers" over image 602 (e.g., by placing his or her finger on image 602, on a touchscreen; or uses a pointing device to move a cursor over image 602), hover text 610 (sometimes also referred to as a "tooltip") may be displayed. Hover text 610 may include some, or all, of the identified caption 605, associated with image 602.

In some implementations, the images shown in FIG. 6B, including image 602, may be user-selectable. That is, content rendering component 410 may generate selectable objects that correspond to each image. The selection of a particular selectable object may cause the image, that corresponds to the object, to be displayed in an enlarged fashion, with its corresponding caption. For example, FIG. 6C, shows an example reformatted page, which may be generated by content rendering component 410, that corresponds to image 602. This reformatted page may be displayed when, for example, a user selects (e.g., taps on a touchscreen) the selectable object, in FIG. 6B, that corresponds to image 602. In FIG. 6C, image 602 may be further enlarged and/or repositioned, and enlarged text 615 may be presented along with image 602. Enlarged text 615 may include some or all of the text of the original caption 605.

Figure 7A:
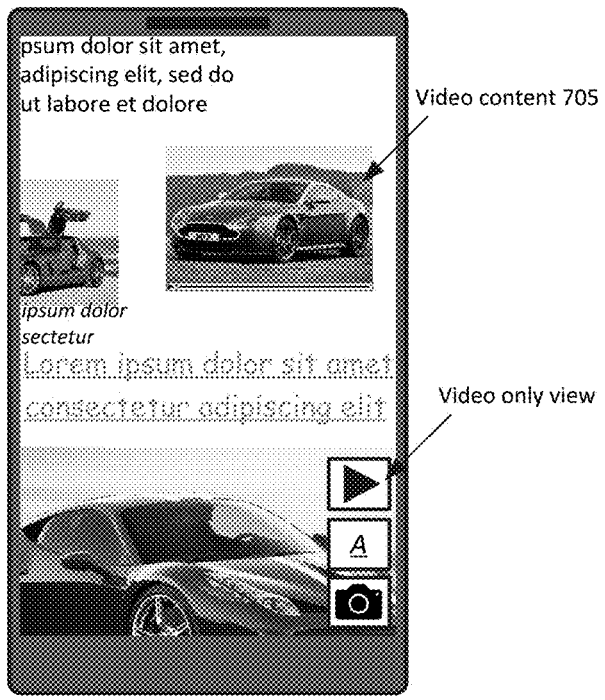
FIGS. 7A and 7B illustrate example user interfaces that correspond to a video content view, in accordance with some implementations
Figure 7B:
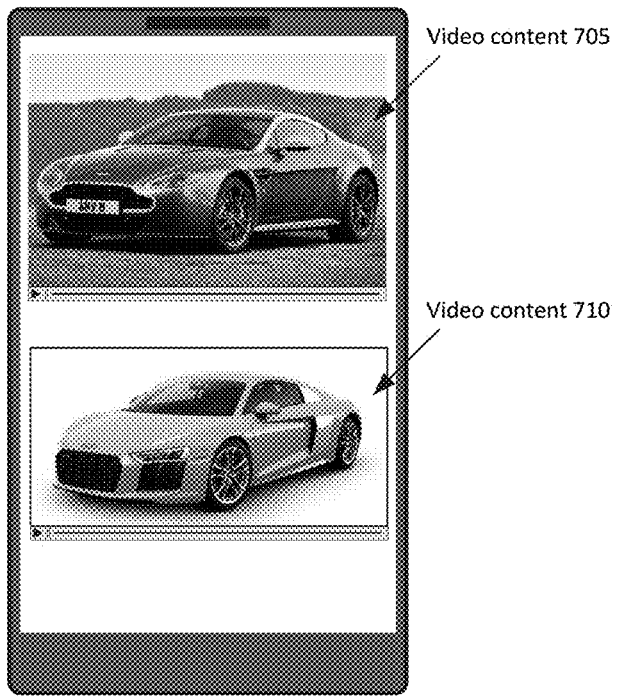

FIGS. 7A and 7B relate to the generation of reformatted web pages, which may be generated by content rendering component 410, that correspond to video content. For instance, FIG. 7A illustrates an example web page, as received from content provider 315. The web page may be presented with a "video only" button (as well as a "text only" button, an "image only" button, and/or one or more other buttons). The web page, shown in FIG. 7A, may include video content 705.

FIG. 7B illustrates an example reformatted web page, that corresponds to the video content included in the original web page shown in FIG. 7A. For instance, the reformatted web page may include video content 705 (i.e., the same video content shown in FIG. 7A), as well as other video content 710, which may have been included in the original web page but not necessarily displayed due to size and/or positioning of video content 710. As shown in FIG. 7B, video content 705 may be repositioned and/or resized, as compared to its original position and/or size in FIG. 7A.

Referring back to FIG. 4, the reformatted web pages may be generated, by content rendering component 410, once a web page is received (e.g., once user device 305 receives an HTML file from content provider 315). That is, content type determination component 405 may determine the types of content in the web page, and content rendering component 410 may generate reformatted web pages before a user requests a particular web page. In other words, content rendering component 410 may generate reformatted web pages without a specific request, from a user, that the reformatted web pages be generated. In some implementations, content rendering component 410 may generate reformatted web pages only upon a specific user request.

User input component 415 may manage user requests for reformatted content. For instance, user input component 415 may cause selectable options to be rendered, with a web page. The selectable options may correspond to the types of content, identified by content type determination component 405. Examples of such selectable options are the "text only" buttons, "image only" buttons, "hybrid" buttons, etc., discussed above. User input component 415 may detect when a user selects a particular option (e.g., a particular content-specific button), and may cause user device 305 (e.g., content rendering component 410) to present a reformatted web page that corresponds to the selected button.

In some implementations, user device 305 may include "soft" and/or hardware buttons, the functions of which may be programmatically altered by a given application. In some implementations, user input component 415 may set the function one or more of these buttons to cause user device 305 to display a content-specific web page generated by content rendering component 410.

Figure 8:
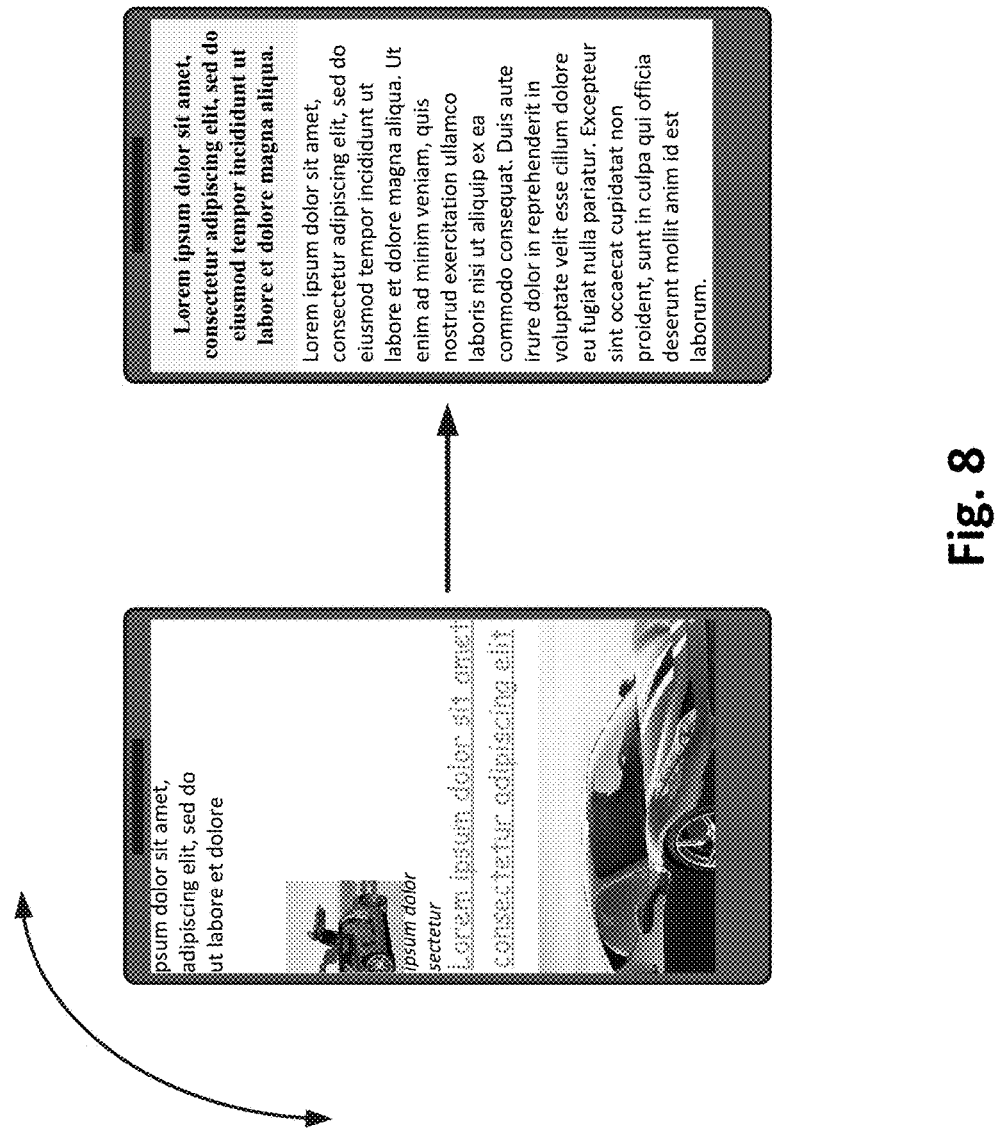
FIGS. 8 and 9 illustrate an example of how different views may be selected by a user.
Figure 9:
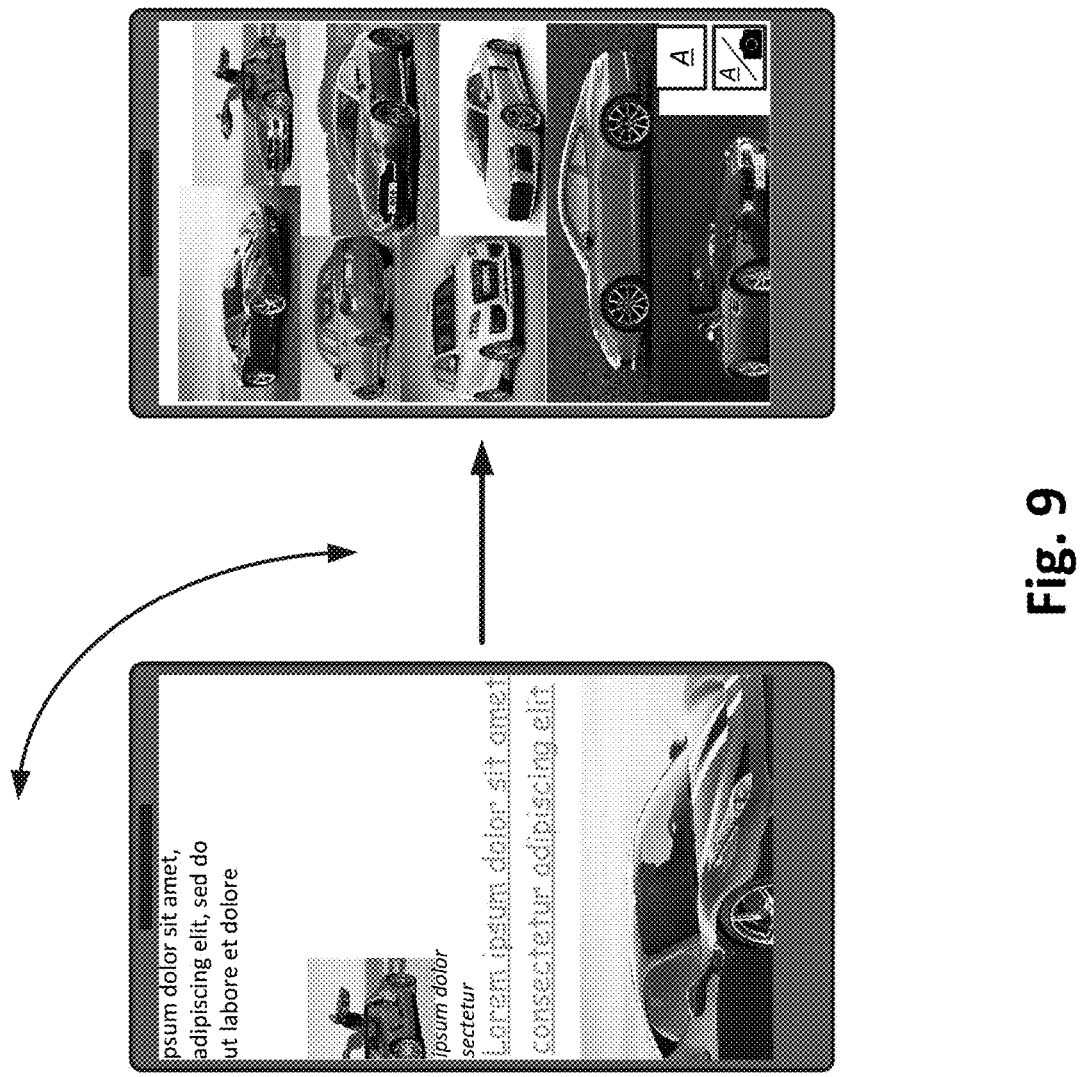

In some implementations, user input component 415 may detect other types of inputs, which may indicate that a user desires to view a content-specific reformatted web page. For instance, as shown in FIGS. 8 and 9, a user may rotate user device 305, to signify that he or she wishes to view a text-specific or an image-specific reformatted web page. For example, as shown in FIG. 8, a user may rotate user device 305 counter-clockwise (and then back to its initial orientation), in order to cause user device 305 to display a reformatted text-specific version of a web page. As shown in FIG. 9, the user may rotate user device 305 clockwise (and then back to its initial orientation), in order to cause customized display component 310 to display a reformatted image-specific version of a web page.

Figure 10:
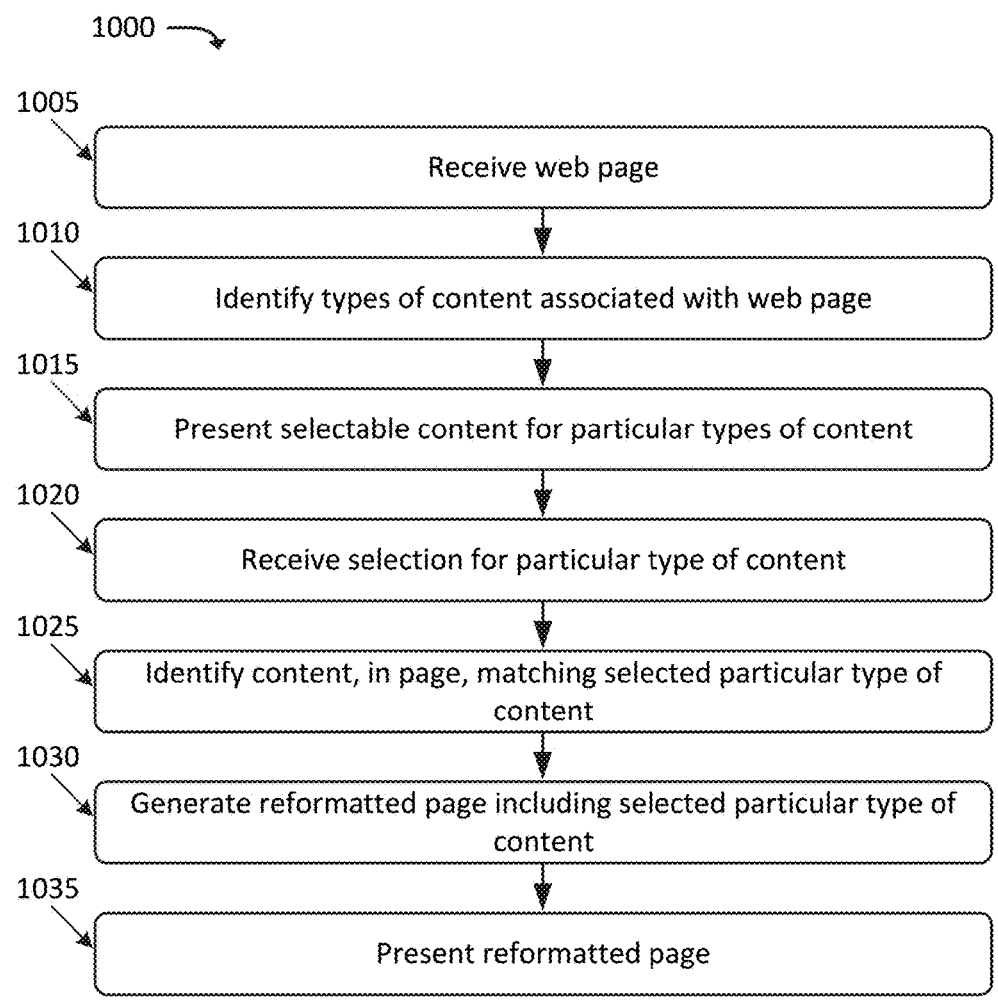
FIG. 10 illustrates an example process for reformatting a web page to include one or more individual types of content present in an original web page.

FIG. 10 illustrates an example process 1000 for presenting reformatted content-specific web pages, in accordance with some implementations. In some implementations, process 1000 may be performed by user device 305 (e.g., by one or more of the components shown in FIGS. 4 and/or 5). In other implementations, some or all of process 1000 may be performed by one or more other devices in addition to, or in lieu of, user device 305.

As shown, process 1000 may include receiving (at 1005) a web page. For instance, as discussed above, user device 305 may receive a web page from content provider 315. The web page may include source code, such as HTML code, and/or code that implements an API via which content provider 315 may explicitly specify types of content in the web page.

Process 1000 may also include identifying (at 1010) types of content associated with the web page. For instance, as described above with respect to content type determination component 405 (e.g., in FIGS. 4 and 5), user device 305 may identify types of content in the web page, such as text, images, video, etc.

Process 1000 may additionally include presenting (at 1015) selectable options for particular identified types of content. For example, as described above with respect to user input component 415, user device 305 may present selectable options, such as visual buttons on a display screen of user device 305, that correspond to one or more of the identified types of content. As another example, one or more of the selectable options may be presented by setting the functionality of one or more physical buttons of user device 305, such that the selection of a physical button indicates a user's request to view a particular type of content.

Process 1000 may further include receiving (at 1020) a selection for a particular type of content. For example, as further described above with respect to user input component 415, user device 305 may receive a user's selection of a particular one of the selectable options (presented at 1015).

Process 1000 may also include identifying (at 1025) content, in the web page, that matches the selected particular type of content, and generating (at 1030) a reformatted page including the selected particular type of content. For example, as described above with respect to content rendering component 410, user device 305 may generate a reformatted web page, that includes only the selected type of content (e.g., and not other types of content). In some implementations, user device 305 may generate the reformatted web page after receiving the user's selection (at 1020). In some implementations, user device 305 may generate the reformatted web page independent of the user's selection (e.g., before the user makes the selection, such as after the web page is received (at 1005)). Process 1000 may further include presenting (at 1035) the reformatted page that includes the selected particular type of content.

Figure 11:
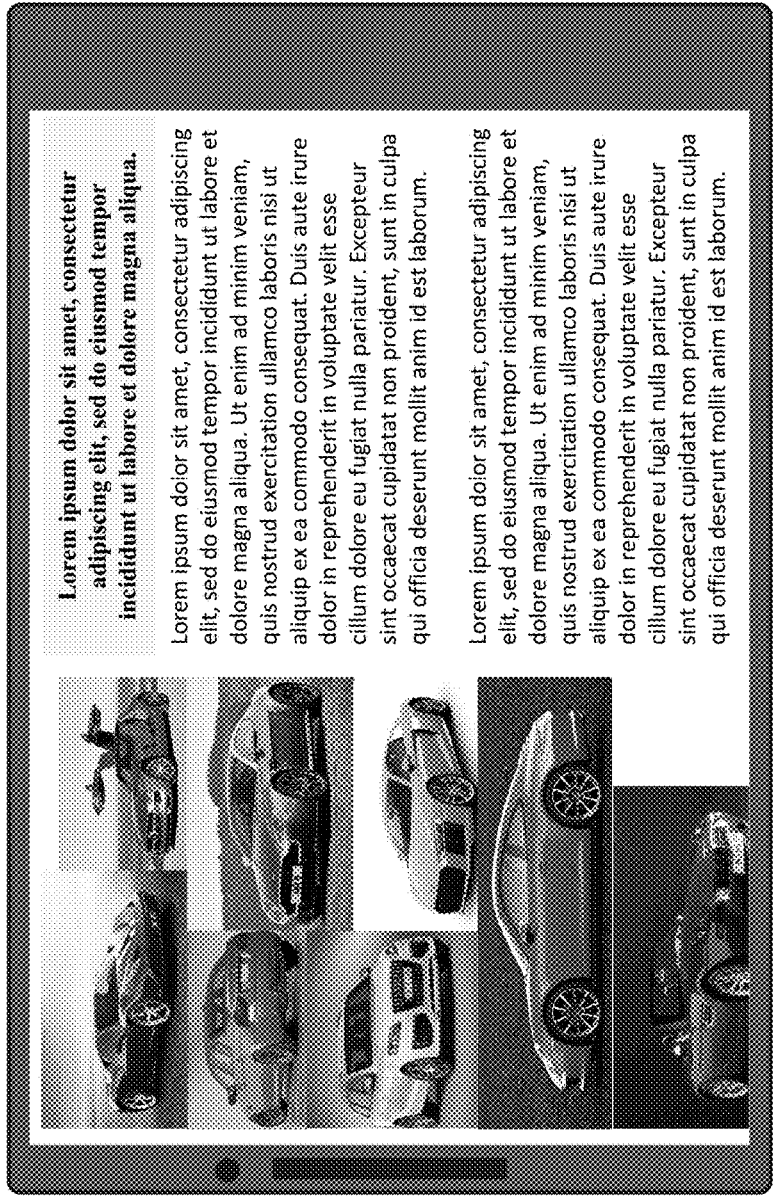
FIG. 11 illustrates an example split pane view, in accordance with some implementations.

FIG. 11 illustrates another example of a hybrid view, mentioned above. In some implementations, some user devices 305 may have relatively large screens, as compared to other user devices 305. For instance, "tablet" devices often have larger screens than smart phones, and can therefore present greater amounts of content. In some implementations, user device 305 may present a "split pane" hybrid view, in which one type of content is presented on one side of the screen, and another type of content is presented on another side of the screen. In some implementations, each pane (e.g., where one pane corresponds to one type of content) may be individually scrollable. For instance, a user may perform a vertical scrolling operation on only the pane relating to images (referring to the example split pane hybrid view shown in FIG. 11), while the pane relating to text is not scrolled.

In some implementations, a split pane hybrid view may have more than two panes. In some implementations, a split pane hybrid view may include panes that, themselves, correspond to hybrid views. For example, one pane of a split pane hybrid view may include text and images, while another pane of the split pane hybrid view may include videos.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, in some implementations, various techniques, some examples of which have been described above, may be used in combination, even though such combinations are not explicitly discussed above. Furthermore, some of the techniques, in accordance with some implementations, may be used in combination with conventional techniques.

As another example, while discussed in the context of a "web page," similar techniques, as described herein, may be applied to any sort of presentation of content, in which the content includes multiple types. Furthermore, the content types may include text, video, or images, as described herein, and/or one or more other content types not explicitly mentioned, without departing from the techniques described herein.

Additionally, while series of blocks and/or signals have been described with regard to FIG. 10, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple networks may be included in a single network, or a particular network may include multiple networks. Furthermore, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance.

Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
    a non-transitory computer-readable medium storing processor-executable instructions; and
    one or more processors configured to execute the processor-executable instructions, wherein executing the processor-executable instructions causes the one or more processors to:
        identify a plurality of types of content associated with a web page, the plurality of types including at least a first type and a second type,
            wherein the first type of content includes image content, and wherein the second type of content includes text content, and
            wherein the text content includes caption text for a particular image of the web page;
        generate a plurality of reformatted pages, wherein a first reformatted page, of the plurality of reformatted pages, corresponds to the first type of content, and wherein a second reformatted page, of the plurality of reformatted pages, corresponds to the second type of content;
        determine that the user device has been rotated from a first orientation to a second orientation and then back to the first orientation;
        present, based on determining that the user device has been rotated from a first orientation to a second orientation and then back to the first orientation, the first reformatted page that corresponds to the first type of content, wherein presenting the first reformatted page includes:
            presenting a reformatted version of the particular image, and
            presenting the caption text as hover text associated with the reformatted version of the particular image;
        determine that the user device has been rotated from the first orientation to a third orientation and then back to the first orientation; and
        present, based on determining that the user device has been rotated from the first orientation to the third orientation and then back to the first orientation, the second reformatted page.

2. The user device of claim 1, wherein the second reformatted page includes the text content associated with the web page, and does not include any of the image content associated with the web page.

3. The user device of claim 2,
    wherein the first reformatted page includes the image content associated with the web page, and does not include any of the text content associated with the web page, other than caption text that is provided as hover text.

4. The user device of claim 1, wherein executing the processor-executable instructions further causes the one or more processors to:
    parse code associated with the web page,
    wherein the plurality of types of content are identified based on parsing the code associated with the web page.

5. The user device of claim 4, wherein the code includes Hyper Text Markup Language ("HTML") code, and
wherein the plurality of types of content are identified based on HTML tags in the HTML code.

6. The user device of claim 1, wherein executing the processor-executable instructions further causes the one or more processors to:
perform at least one of image recognition or optical character recognition ("OCR") on the web page,
wherein the plurality of types of content are identified based on the image recognition or the OCR performed on the web page.

7. The user device of claim 1, wherein the rotation from the first orientation to the second orientation is a clockwise rotation, and
wherein the rotation from the first orientation to the third orientation is a counter-clockwise rotation.

8. The user device of claim 1, wherein presenting the caption text as hover text includes:
displaying the hover text when a finger of a user, or a cursor, is positioned over the reformatted version of the particular image; and
forgoing displaying the hover text when the finger of the user and the cursor are not positioned over the reformatted version of the particular image.

9. The user device of claim 1, wherein presenting the caption text as hover text includes:
displaying the hover text in a manner that does not obscure the reformatted version of the particular image.

10. The user device of claim 1, wherein the reformatted version of the particular image is a first reformatted version of the particular image, wherein executing the processor-executable instructions further causes the one or more processors to:
present the first reformatted version of the particular image as a selectable graphical element;
receive a selection of the selectable graphical element;
present, based on receiving the selection of the selectable graphical element, a second reformatted version of the particular image, wherein the second reformatted version of the particular image is larger than the first reformatted version of the particular image.

11. A non-transitory computer-readable medium storing processor-executable instructions, which, when executed by a processor of the user device, cause the processor to:
identify a plurality of types of content associated with a web page, the plurality of types including at least a first type and a second type,
wherein the first type of content includes image content, and wherein the second type of content includes text content, and
wherein the text content includes caption text for a particular image of the web page;
generate a plurality of reformatted pages, wherein a first reformatted page, of the plurality of reformatted pages, corresponds to the first type of content, and wherein a second reformatted page, of the plurality of reformatted pages, corresponds to the second type of content;
present, based on determining that the user device has been rotated from a first orientation to a second orientation and then back to the first orientation, the first reformatted page that corresponds to the first type of content, wherein presenting the first reformatted page includes:
presenting a reformatted version of the particular image, and
presenting the caption text as hover text associated with the reformatted version of the particular image;
determine that the user device has been rotated from the first orientation to a third orientation and then back to the first orientation; and
present, based on determining that the user device has been rotated from the first orientation to the third orientation and then back to the first orientation, the second reformatted page.

12. The non-transitory computer-readable medium of claim 11, wherein the second reformatted page includes the text content associated with the web page, and does not include any of the image content associated with the web page.

13. The non-transitory computer-readable medium of claim 12,
wherein the first reformatted page includes the image content associated with the web page, and does not include any of the text content associated with the web page, other than the caption text that is presented as hover text.

14. The non-transitory computer-readable medium of claim 11, further comprising processor-executable instructions to:
parse code associated with the web page,
wherein the plurality of types of content are identified based on parsing the code associated with the web page.

15. The non-transitory computer-readable medium of claim 11, wherein the rotation from the first orientation to the second orientation is a clockwise rotation, and
wherein the rotation from the first orientation to the third orientation is a counter-clockwise rotation.

16. A method, implemented by a user device, the method comprising:
identifying, by the user device, a plurality of types of content associated with a web page, the plurality of types including at least a first type and a second type,
wherein the first type of content includes image content, and wherein the second type of content includes text content, and
wherein the text content includes caption text for a particular image of the web page;
generating, by the user device, a plurality of reformatted pages, wherein a first reformatted page, of the plurality of reformatted pages, corresponds to the first type of content, and wherein a second reformatted page, of the plurality of reformatted pages, corresponds to the second type of content;
presenting, by the user device and based on determining that the user device has been rotated from a first orientation to a second orientation and then back to the first orientation, the first reformatted page that corresponds to the first type of content, wherein presenting the first reformatted page includes:
presenting a reformatted version of the particular image, and
presenting the caption text as hover text associated with the reformatted version of the particular image;
determining, by the user device, that the user device has been rotated from the first orientation to a third orientation and then back to the first orientation; and
presenting, by the user device and based on determining that the user device has been rotated from the first orientation to the third orientation and then back to the first orientation, the second reformatted page.

17. The method of claim 16, wherein the second reformatted page includes the text content associated with the web page, and does not include any of the image content associated with the web page, and wherein the first reformatted page includes the image content associated with the web page, and does not include any of the text content associated with the web page.

18. The method of claim 16, further comprising:

parsing code associated with the web page, wherein the plurality of types of content are identified based on parsing the code associated with the web page.

19. The method of claim 16, further comprising:

performing at least one of image recognition or optical character recognition ("OCR") on the web page, wherein the plurality of types of content are identified based on the image recognition or the OCR performed on the web page.

20. The method of claim 16, wherein the rotation from the first orientation to the second orientation is a clockwise rotation, and wherein the rotation from the first orientation to the third orientation is a counter-clockwise rotation.

\* \* \* \* \*